(12) United States Patent
Mulligan (10) Patent No.: US 6,212,190 B1
(45) Date of Patent: Apr. 3, 2001

(54) METHOD AND SYSTEM FOR GENERATING DATA PACKETS ON A HETEROGENEOUS NETWORK

(75) Inventor: Geoffrey Mulligan, Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/880,200

(22) Filed: Jun. 23, 1997

(51) Int. Cl.[7] .............................. H04L 12/28; H04J 3/24; H04J 3/22
(52) U.S. Cl. .................... 370/400; 370/472; 370/473; 370/470; 370/474
(58) Field of Search ...................................... 370/351, 389, 370/465, 466, 467, 470, 471, 472, 474, 476, 400, 401

(56) References Cited

U.S. PATENT DOCUMENTS

| | | | |
|---|---|---|---|
| 5,425,023 | * 6/1995 | Haraguchi et al. | 370/60 |
| 5,541,919 | * 7/1996 | Yong et al. | 370/56 |
| 5,602,853 | * 2/1997 | Ben-Michael et al. | 370/474 |
| 5,751,970 | * 5/1998 | Bournas | 395/200.66 |
| 5,790,544 | * 8/1998 | Aho et al. | 370/395 |
| 5,802,051 | * 9/1998 | Petersen et al. | 370/395 |
| 5,822,321 | * 10/1998 | Petersen et al. | 370/474 |
| 5,892,761 | * 4/1999 | Stracke, Jr. | 370/395 |
| 5,959,974 | * 9/1999 | Badt et al. | 370/233 |
| 5,995,726 | * 11/1999 | Dillon | 709/231 |
| 6,016,388 | * 1/2000 | Dillon | 709/242 |

* cited by examiner

Primary Examiner—Ajit Patel
Assistant Examiner—Hahn Nguyen
(74) Attorney, Agent, or Firm—Finnegan, Henderson, Farabow, Garrett & Dunner, L.L.P.

(57) ABSTRACT

An improved method and system for generating packets for transmission over different routes on a network is presented. In a large network such as the Internet, each route over the network carries different size packets which are not compatible unless they are fragmented into smaller segments. Initially, the technique determines a maximum transmission unit (MTU) capable of being transmitted over a predetermined route. Next, the size of each packet to be transmitted over the network is compared with the MTU size. If the comparison indicates the packet is larger than the MTU, the packet must be processed further before it can be transmitted over the route. The additional processing initially divides the total number of transmission units contained within the packet by the MTU value. The integer result of this division is temporarily stored in a DCOUNT variable and the remainder of the division in a RCOUNT variable. If the remainder in RCOUNT is non-zero, the value in DCOUNT is incremented by one. The DCOUNT value indicates the minimum number of datagrams for sending a packet using the present technique. Next, the transmission units contained in the original packet are redistributed equally into DCOUNT packets and then sent over the network route.

17 Claims, 8 Drawing Sheets

METHOD AND SYSTEM FOR GENERATING DATA PACKETS ON A HETEROGENEOUS NETWORK

FIELD OF THE INVENTION

Embodiments of the present invention relate generally to network communications and, more specifically, to a method and system for generating data packets over a heterogeneous network of computers.

BACKGROUND OF THE INVENTION

Network computing has grown at a phenomenal rate over the last decade. In a network computing environment, the user has access to the computing power of multiple computers coupled to the network. Sun Microsystems Inc., a leader in network computing, has even devised a marketing campaign around the slogan "The Network Is the Computer"™ to emphasize the commercial success of this growing segment of the computing market. (The Network Is the Computer, Sun, the Sun logo, Sun Microsystems, Solaris, Ultra and Java are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.) Recently, this slogan has become reality as many millions of users have tapped the computing resources available from the thousands of computers available on the Internet and the World Wide Web.

The wide spread growth of the Internet and the World Wide Web can be attributed to the use of standard networking protocols and routers which couple different networks together. A typical network protocol, such as TCP/IP, includes an application layer, a process layer, a host-to-host protocol layer (TCP/UDP), an internet protocol layer (IP), a network protocol layer and a physical layer. Often, routers are used to convert information from different networks at the physical layer and the network layer. In particular, the different physical layers have a corresponding media access layer (MAC) which specifies, among other things, the maximum transmission unit (MTU) which can be transmitted over the physical medium. Generally, the MTU is defined as a maximum number of transmission units any network segment is capable of transmitting. As part of the conversion process, routers may be required to fragment packets traveling from a network with a large MTU into smaller segments on a network with a smaller MTU.

For example, the Internet is a heterogeneous IP network which couples together different physical media and corresponding MAC layers which include Ethernet, IEEE 802.3 (CSMA/CD), IEEE 802.4 (Token ring), PPP/SLIP (dial-up), T-1, T-3, and air interfaces for wireless technologies such as CDMA, TDMA, AMPS, and GSM. At the higher layers, these different networks share host-to-host protocols such as TCP, UDP and application protocols such as mail, finger, and ftp. Even across different networks, these higher layer protocols remain compatible. However, at the network and MAC layers these different networks have a wide variety of MTU values and generate datagram segments which are often incompatible in size. As of November 1990, common MTUs (in bytes) associated with various data links on the Internet include: 65535 Theoretical Maximum (RFC 791); 65535 Hyperchannel (RFC 1044); 17914 IBM Token Ring (RFC 791); 8166 IEEE 802.4 (RFC 1042); 4464 IEEE 802.5 (4 Mb max) (RFC 1042); 4352 FDDI (revised) (RFC 1188); 2048-4352 Wideband Network (RFC 1188); 2002 IEEE 802.5 (4 Mb recommended) (RFC 1042); 1536-2002 Exp. Ethernet Nets (RFC 895); 1500 Ethernet Networks (RFC 894); 1500 Point-to-Point (default) (RFC 1134); 1492 IEEE 802.3 (RFC 1042); 1006-1492 SLIP (RFC 1055); 1006 ARPANET (BBN 1822); 576-1006 X.25 Networks (RFC 877); 544 DEC IP Portal; 512 Netbios (RFC 1088); 508 IEEE 802/Source-Rt Bridge; (RFC 1042); 508 ARCNET (RFC 1051); 296-508 Point-to-Point (low delay) (RFC 1144); 68 Official minimum MTU. The RFC or request for comment number can be used to locate the corresponding document published by the Internet Engineering Task Force (IETF).

MTU incompatibility arises because datagrams are packets of information sent over a connectionless network. In other words, there is no single connection between a source and a destination node in which a packet of information is restricted to travel. Instead, each packet typically travels over a different path of a heterogeneous network to arrive at the destination node. Consequently, each datagram may be fragmented by different amounts to conform to the MTU of each intermediary network. For example, datagram segments transmitted from an Ethernet network typically are 1500 bytes long and must be split into several smaller datagram segments to travel over an X.25 (MTU 576) or Netbios (MTU 512) physical network layer. Thus, the routers used in the Internet spend a great deal of processor cycles requesting smaller datagram segment sizes or fragmenting these segments into smaller segments compatible on other portions of the network.

Unfortunately, achieving network interoperability by successive fragmentation reduces network performance because of increased data processing and transmission overhead. Initially, fragmentation drains the processing power of routers as the large segments are reduced into smaller and smaller segments for transmission over networks having physical network layer's with successively smaller MTUs. On the receiving end, the destination host expends more processing power and resources to buffer the enlarged pool of segments and to reassemble the enlarged pool of segments into the original message. Moreover, sending additional packets over the network increases the amount of packet header information transmitted and thus reduces the effective network bandwidth.

Controlling fragmentation is particularly challenging on a connectionless network because, as discussed above, each segment may be transmitted over a different route. Some segments, known as datagrams on a connectionless network, may be transmitted over a route with a large MTU and not require fragmentation. However, if a segment of the network fails or is incorrectly reconfigured, the network topology will change and subsequent segments may be sent over a route with a smaller MTU and requiring extensive fragmentation. Complex routings make it difficult for the source host to select the appropriate datagram size which will minimize the fragmentation. For example, assume a primary route used over the Internet includes an IEEE 802.4 network having a an MTU of 8166 bytes and a secondary route includes a an X.25 network having a much smaller MTU of 576 bytes. To minimize the number of packets transmitted, assume that each datagram is based on the larger MTU of the two routes and contains 8166 bytes. Initially, datagrams transmitted over the primary route do not require any fragmentation. However, when the primary route becomes unavailable or busy the network topology changes and the secondary route, with the smaller MTU of 576 bytes, takes the traffic. Consequently, the routers fragment each of the remaining datagrams and transmits them over the Internet which, as previously discussed above, reduces the effective network bandwidth. Clearly, selecting a datagram size which minimizes fragmentation on a connectionless network is a difficult task.

Current techniques for selecting a datagram size which reduces overall fragmentation yet optimizes the network bandwidth have had limited success. A common practice assumes the data is going to be transmitted over a local network and generates datagrams based on the local network MTU. Unfortunately, this technique will result in fragmentation and increased overhead if the datagrams are transmitted over remote networks having an MTU smaller than the local network MTU size. For example, assume a data transmission is sent from one Ethernet to another Ethernet coupled together by router devices and an X.25 network. Further assume the MTU of the Ethernet networks are 1500 bytes and the MTU of the X.25 network between the two Ethernet networks is 576 bytes. Accordingly, datagrams generated using this first technique will be fragmented into two 576 byte datagrams and one 348 byte datagram to cross over the X.25 network. This technique typically does not reduce fragmentation unless the datagram stays on the local network.

Another technique, determines how large the datagrams should be based upon the lesser of 576 bytes or the first-hop MTU when sending to any network that is not connected to the same local network or subnet as the source host. In this context, a hop count measures the distance travelled on a network by counting the number of routers, switches, or bridges traversed by a given packet. A hop count of M associated with a packet indicates that the packet has traversed approximately M different networks. As a corollary, the first-hop MTU of a network is the MTU of a network exactly one hop away from the transmitting network. Unfortunately, this technique of selecting an MTU typically generates smaller datagrams than necessary and results in network inefficiencies and wastes available network bandwidth. Further, this may also result in fragmentation when a datagram traverses a network with an MTU smaller than 576.

A third technique determines the size of the datagrams based upon the path MTU (PMTU) of a route between a source node and a destination node on a network. A PMTU discovery technique as applied to an IP network is documented in RFC 1191 entitled "Path MTU Discovery" written by Jeffrey Mogul and Steve Deering and published in conjunction with the Internet Engineering Task Force (IETF). Briefly, this technique uses a "Don't Fragment" (DF) bit in the IP header to dynamically discover the PMTU of an arbitrary network path. At first, the source host assumes the PMTU is the first-hop MTU and sends all the datagrams on that path with the DF bit set. If these datagrams are too large to be forwarded without fragmentation by some router along the arbitrary network path, the offended router will drop the oversized datagrams and return an Internet Control Message Protocol (ICMP) Destination Unreachable message to the source node with a special code indicating "fragmentation needed and DF bit set". In response, the source node repeats the above process using smaller and smaller datagrams until the datagrams are delivered without fragmentation. Unfortunately, each successive datagram transmitted over a connectionless network such as the Internet can traverse a different route and have a different PMTU value than the previous datagram transmitted over the same network. Thus, even systems using Path MTU Discovery will fail to reduce fragmentation and thereby decrease the effective bandwidth of the network when packet retransmissions become excessive.

Consequently, what is needed is a method and system for generating packets used in a network which reduces the amount of fragmentation and increases the effective network bandwidth associated with transmitting packets over a network.

SUMMARY OF THE INVENTION

Embodiments of the present invention provide an improved method and system for generating packets for transmission over different routes on a network. In a large network such as the Internet, each route over the network carries different sized packets which can not be immediately transmitted between networks unless they are fragmented into smaller interoperable segments. Initially, the technique determines a maximum transmission unit (MTU) capable of being transmitted over a predetermined route. Next, the size of each packet to be transmitted over the network is compared with the MTU size. If the comparison indicates a packet is larger than the determined MTU, the packet is processed further before it is transmitted over the route. The additional processing initially divides the total number of transmission units contained within the packet by the MTU value. The result of this division is temporarily stored in a DCOUNT storage unit and the remainder of the division is stored in a RCOUNT storage unit. If the remainder in RCOUNT is non-zero, the value in DCOUNT is incremented by one. The DCOUNT value indicates the minimum number of datagrams for sending a packet using the present technique. Next, the transmission units contained in the original packets are redistributed equally into DCOUNT packets and prepared for transmission over the network route.

There are several advantages to embodiments of the present invention which were previously unavailable in the art. First, techniques provided in the present invention reduce the probability of fragmentation without increasing the amount of network overhead because the number of datagrams transmitted remains substantially unchanged. In the best case, these techniques will significantly reduce fragmentation and thus increase the effective network bandwidth while in the worst case, these techniques will perform as efficiently as other methods.

Embodiments of the present invention are also advantageous because they increase network performance without introducing incompatibilities into the network protocols. In most large networks any change to a low level layer in the network protocol invariably results in incompatibilities and reduces network interoperability. This is especially true on the Internet where hundreds and thousands of computers running protocols such as IP or TCP/IP can not be readily modified. This dilemma does not occur from the use of the present invention because the improvements to network processing described herein do not fundamentally change how the IP protocol operates. Accordingly, teachings of the present invention provide an eloquent solution to the difficult problem of maintaining network interoperability and improving effective network bandwidth for the transmission of data packets.

DETAILED DESCRIPTION

Environment

Figure 1:
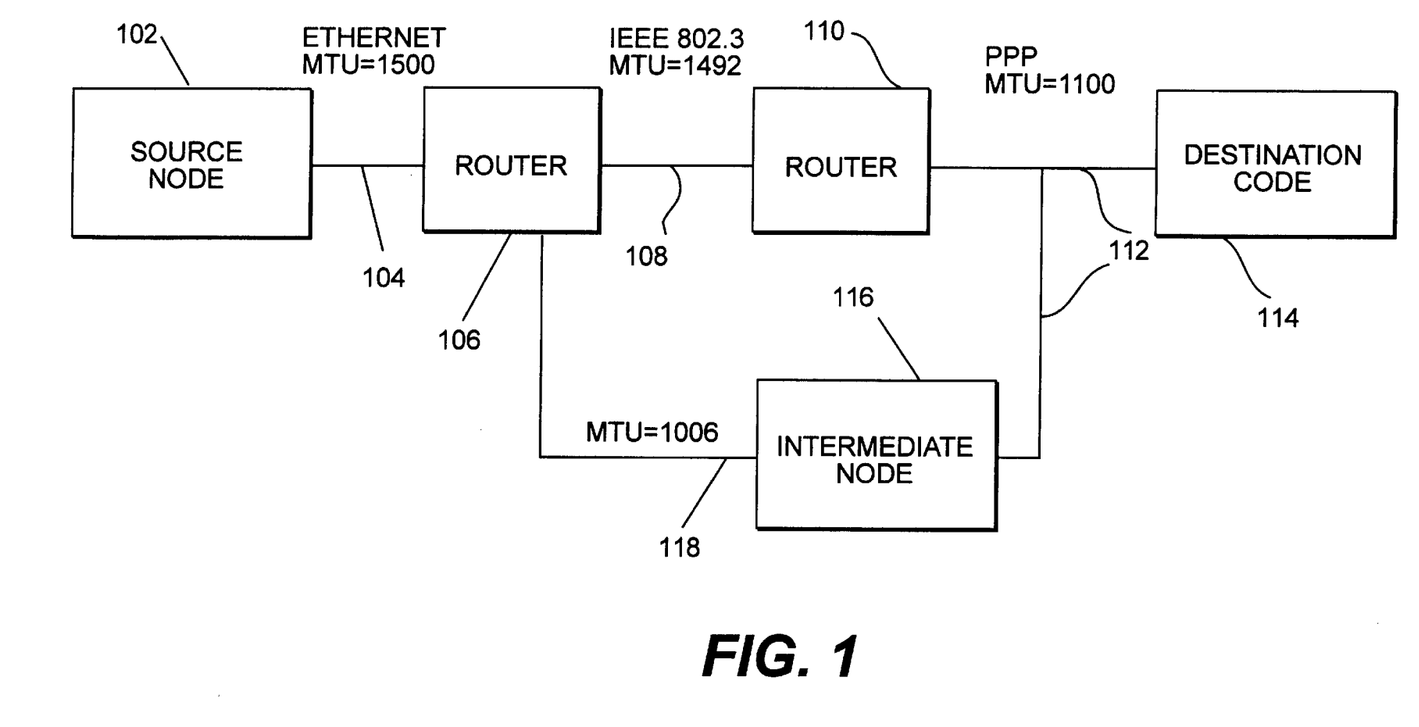
FIG. 1 illustrates a computer network for practicing one embodiment of the present invention.

FIG. 1 illustrates a computer network 100 for practicing one embodiment of the present invention. In this example, source node 102 and destination node 114 transmit data to each other over a primary route including networks 104, 108, and 112, using router 106 and router 110. Alternatively, source node 102 and destination node 114 may communicate over a secondary route including networks 104, 118, and 112, using router 106 and intermediary node 116. Computer network 100 (FIG. 1) typically provides data communication through one or more networks to other data devices. For example, network 100 can provide a network connection between source node 102 and destination node 114, in part, using a world wide packet data communication network now commonly referred to as the "Internet". The Internet uses electrical, electromagnetic, or optical signals to carry digital data streams representing various types of information. The signals carried through computer network 100 carry the digital data to and from source node 102, are exemplary forms of carrier waves transporting the information.

Source node 102 can send messages and receive data, including program code, through network 100. In the Internet example, a destination node 104 might transmit a requested code for an application program through the Internet using network 100 to source node 102. In accord with the invention, one such downloaded application is Method and System for Generating Data Packets on a Heterogeneous Network and described herein. The received code can be executed by source node 102 as it is received, and/or stored in a storage device for later execution. In this manner, source node 102 can obtain application code in the form of a carrier wave.

Those skilled in the art understand that the routers and nodes discussed above can be implemented as a process executing within a general purpose computer or as a stand-alone devices dedicated to receiving and processing data packets transmitted over the network. Accordingly, the general components of these devices are illustrated in FIG. 2.

Figure 2:
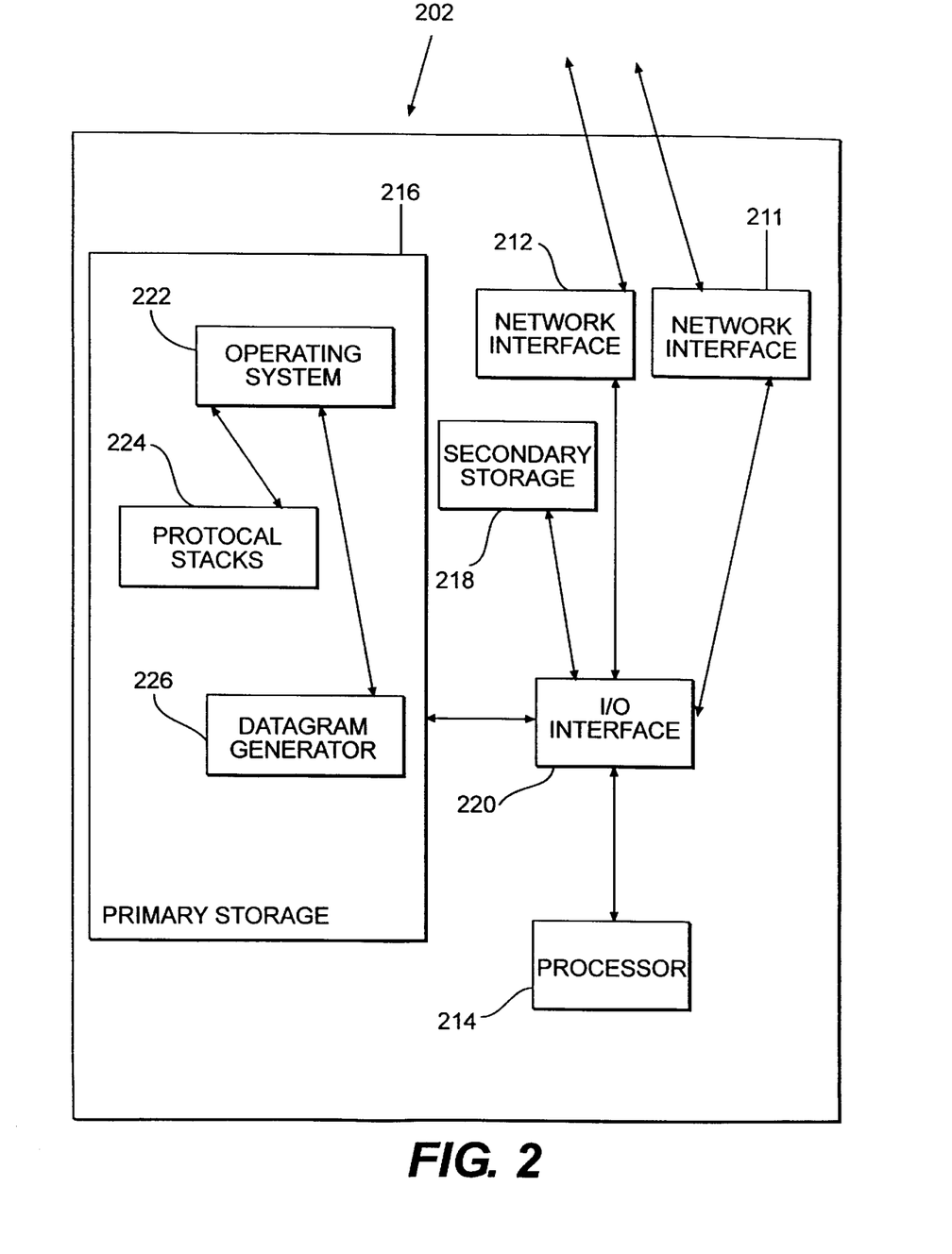
FIG. 2 is a block diagram that illustrates the essential components of a computer system configured to operate as a router or node on a network.

Referring to FIG. 2, a block diagram illustrates the essential components of a computer system configured to operate as a router or node on network 100 (FIG. 1). A computer system 202 in FIG. 2 includes a first network interface 212, a second network interface 211, a processor 214, a primary storage 216, a secondary storage 218, and an I/O (input output) interface 220 which facilitates communication between these aforementioned elements. Network interface 212 couples computer system 202 to network 100 (FIG. 1) and facilitates communication between computer system 202 and other nodes on network 100 (FIG. 1). Network interface 211 couples computer system 202 to a second network (not shown) and facilitates communication between computer system 202 and other nodes on network 100 (FIG. 1) or nodes on a second network (not shown). Those skilled in the art understand that a router device typically has multiple network interfaces used to join together multiple different networks. Accordingly, the exemplary computer system 202 in FIG. 2 is configured for two different networks but could also be coupled to additional networks by adding one or more network interfaces.

In FIG. 2, processor 214 on computer system 202 fetches computer instructions from primary storage 216 through I/O interface 220. After retrieving these instructions, processor 214 then execute these the computer instructions. Executing these computer instructions enables the processor 214 to retrieve data or write data to primary storage 216, display information on one or more computer display devices (not shown), receive command signals from one or more input devices (not shown), or retrieve data or write data to secondary storage 218 or other nodes on network 100 (FIG. 1) such as source node 102, destination node 114, intermediate node 116, router 106, or router 110. Processor 214 can also perform the above functions on the nodes associated with other networks coupled to computer system 202 but not illustrated in FIG. 2. Those skilled in the art also understand that primary storage 216 and secondary storage 218 can include any type of computer storage including, without limitation, randomly accessible memory (RAM), read-only-memory (ROM), magnetic storage devices and optical storage media such as CD-ROM. Processor 214 can be any of the SPARC compatible processors, UltraSPARC compatible processors or Java compatible processors available from Sun Microsystems, Inc. of Mountain View, Calif. Alternatively, processor 214 can be based on the PowerPC processor available from Apple, Inc. of Cupertino, Calif., any of the Pentium or x86 compatible processors available from the Intel Corporation or other corporations such as AMD, and Cyrix, or any other special purpose processors.

Referring to FIG. 2, primary storage 216 includes an operating system 222 for managing computer resources. Preferably, this operating system can be the Solaris operating system or any operating system capable of supporting the processing requirements associated with processing data packets and datagrams in a network computing environment. In an alternative embodiment, operating system 222 can be the Internetworking Operating System (IOS) used in CISCO Inc. router devices or the analogous operating systems used in Ascend Inc., Bay Network, Inc., or 3 Com, Inc. router devices. Also included in primary storage are one or more protocol stacks 224 such as TCP/IP, X.25, SNA, or portions of network operating systems such as NetWare® for use in converting datagrams between the different networks (NetWare is a registered trademark of Novell, Inc. in the United States and other countries). Working in conjunction with these protocol stacks 224 is a datagram generator 226 used to generate datagrams in accordance with one embodiment of the present invention.

Figure 3:
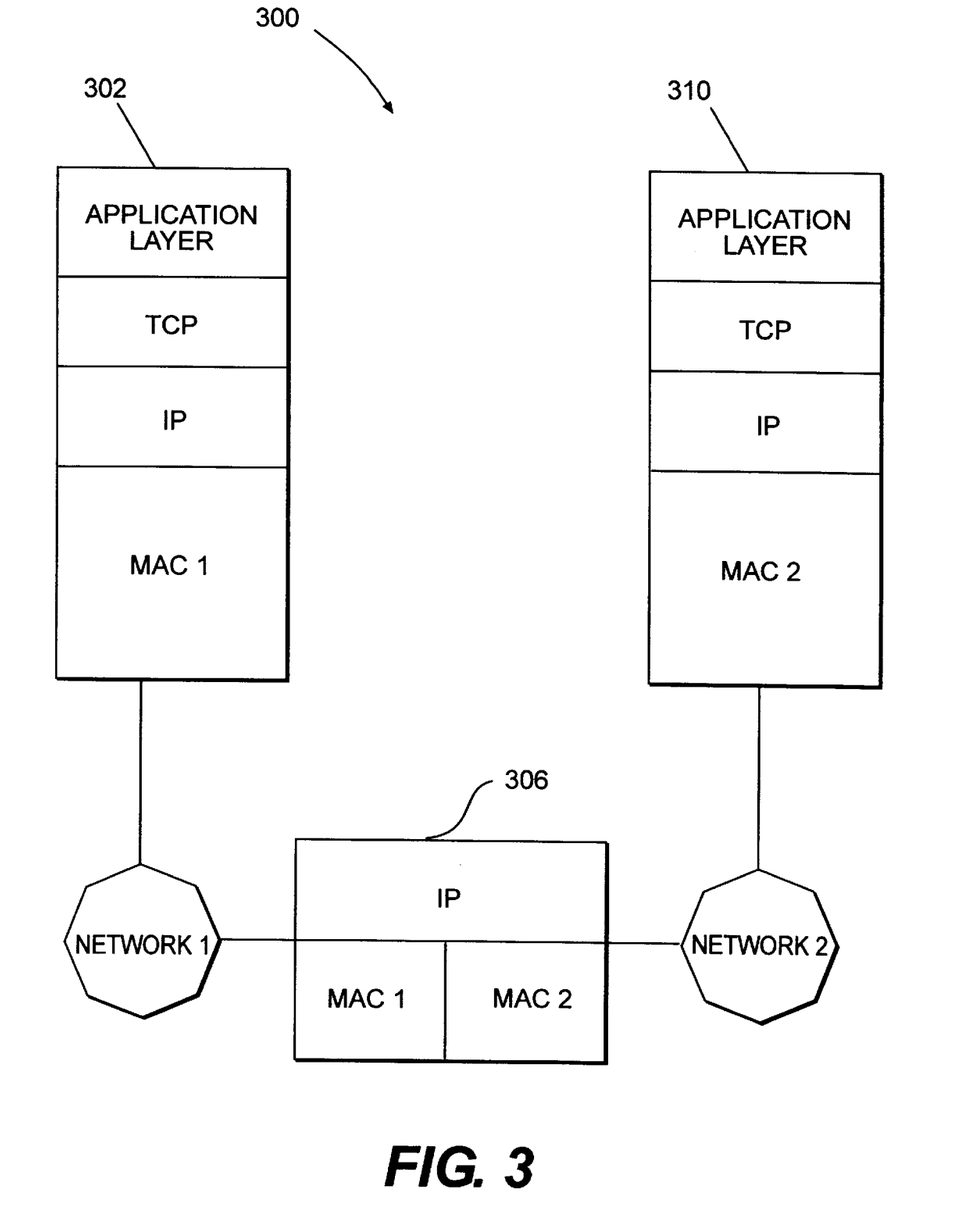
FIG. 3 is a block diagram that illustrates different protocol layers used on exemplary router devices and nodes on a computer network.

In practice, router 202 illustrated in FIG. 2 may only contain a portion of the protocol stacks necessary for converting the datagrams between the different networks. For example, in an IP network the router typically includes the layers below the IP layer which are different on the two different networks. Referring to FIG. 3, router device 306 includes the IP layer in addition to the lower layer media access protocol 1 (MAC 1) used on a first network and a media access protocol 2 (MAC 2) used on the second network. As previously discussed above, different network mediums also utilize different corresponding MAC protocols. Meanwhile, each node on the different networks includes a complete protocol stack for processing applications which includes a network access layer, a transport layer, and an application layer. These additional layers provide higher level functionality to the end-user, application, or remote device. Accordingly, FIG. 3 also shows that nodes 302 and 310 include an application layer and a TCP layer in addition to the IP layer and appropriate media access protocols.

Figure 4A:
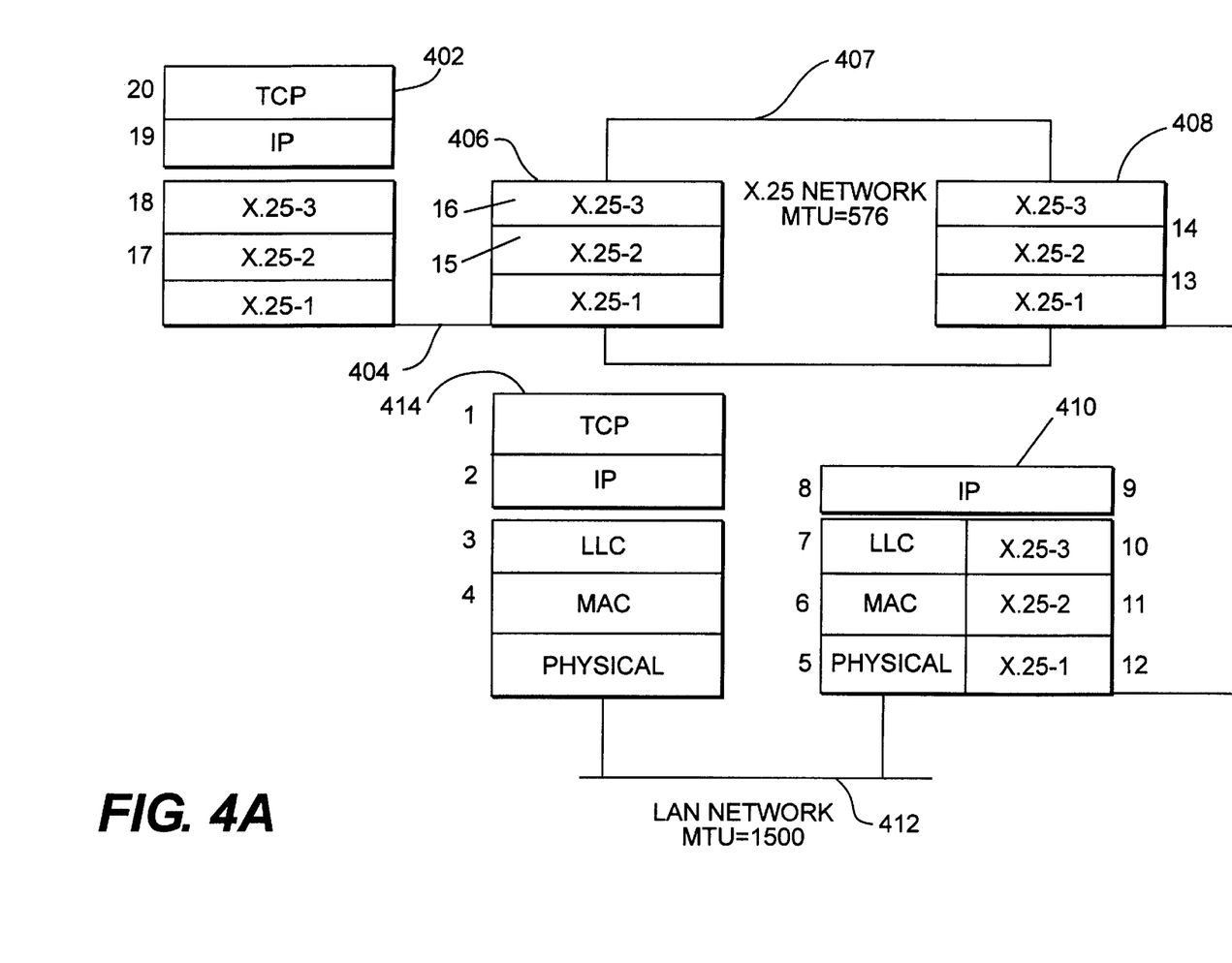
FIG. 4A is a block diagram which illustrates how the IP layer can be used to transmit data between a source node on a packet switching network to a destination node.
Figure 4B:
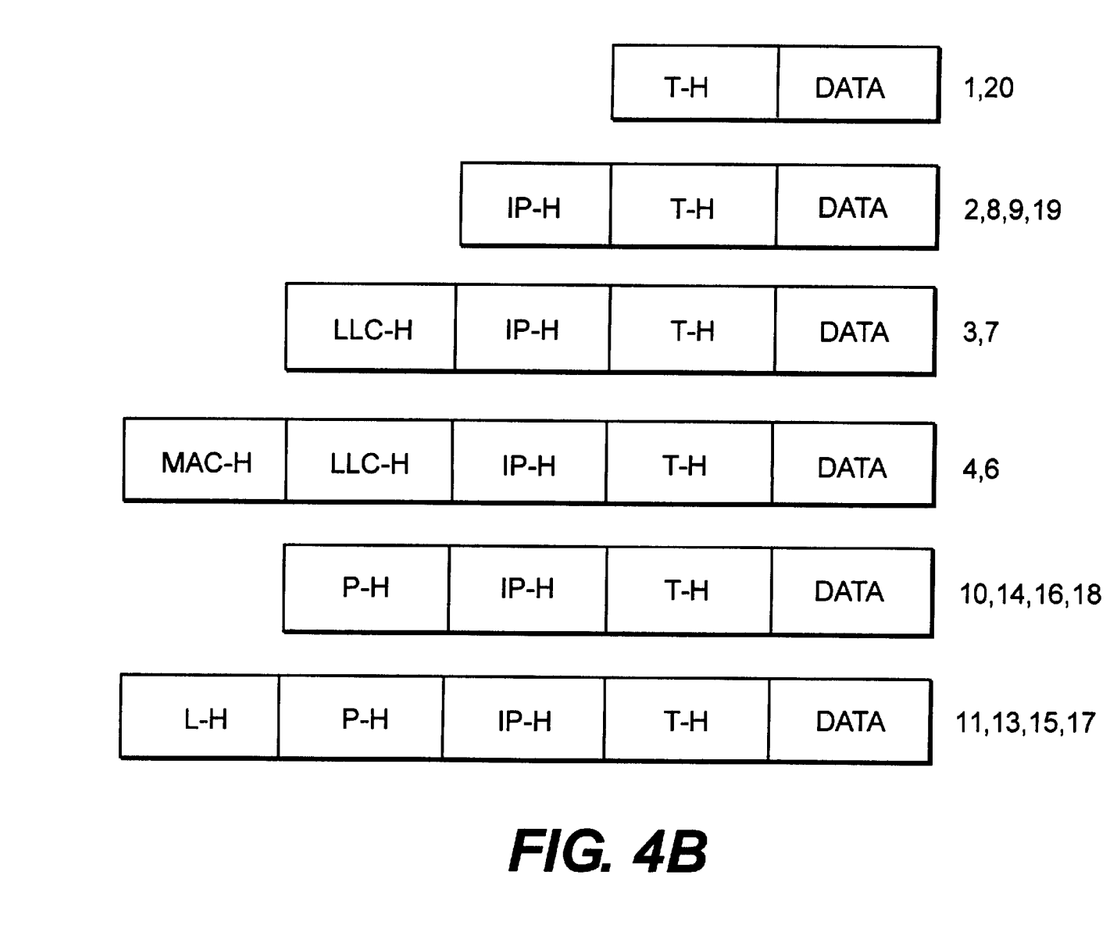
FIG. 4B is a diagram illustrating typical modifications made to a data packet being transmitted across an IP network.

At this point, a rudimentary discussion of the IP layer's role in a heterogeneous computer network helps set the stage for the present invention. FIG. 4A is a block diagram which illustrates how the IP layer is used to transmit data between a first node 402 located on a X.25 packet switching network 407 to a second node 414 on an ethernet local area network 412. Hardware associated with managing each protocol stack and processing transmitted data has been omitted for this example to emphasize the operation of the IP protocol. FIG. 4B is a diagram illustrating the modifications made to a data packet being transmitted across the IP network as shown in FIG. 4A at steps 1 through 15. For brevity, the segments in FIG. 4B have been abbreviated as follows: transport header (T-H), Internet Protocol header (IP-H), X.25 packet header (P-H), LAP-B link header (L-H), LAB-B trailer (L-T), LLC header (LLC-H), MAC header (MAC-H), MAC trailer (MAC-T).

Referring to FIG. 4A, data transmitted by second node 414 back to node 402 is encapsulated in an internet protocol data unit, a datagram having an IP header and a transport header corresponding to the TCP layer. To forward the datagram over the IP network, the datagram IP header includes the address of first node 402 and a lower level network packet header includes MAC address of a router 410. The MAC address for router 410 is included along with the address of first node 402 because first node 402 is not directly accessible to second node 414. Router 410 acts as a liaison between the different network protocols used on ethernet network 412 and X.25 network 407. In this example, the X.25 packet switching network layer 3 is used to encapsulate the IP packet as it travels through the X.25 network. Eventually, the encapsulated datagram is transmitted through X.25 network 407 to first node 402 where the original IP datagram is made available for further processing. Although a detailed discussion of the X.25 network operation is beyond the scope of this discussion, it is important to note that the original IP datagram is not modified by the X.25 network.

Before actually sending the IP datagram, router 410 must also make sure the IP datagrams do not exceed the MTU of the network receiving the datagram. For example, if the datagram segment is larger than the MTU of the receiving network, router 410 must fragment the datagram into one or more smaller datagrams. In FIG. 4A, a datagram sent over an X.25 network having an MTU of 576 must be divided into a least 3 datagrams if it is received from an ethernet network (IEEE 802.3) having an MTU of 1500 bytes. As previously discussed, fragmentation decreases network efficiency because smaller datagrams increase the percentage of header information transmitted and typically increase the number of packet retransmissions.

Figure 5A:
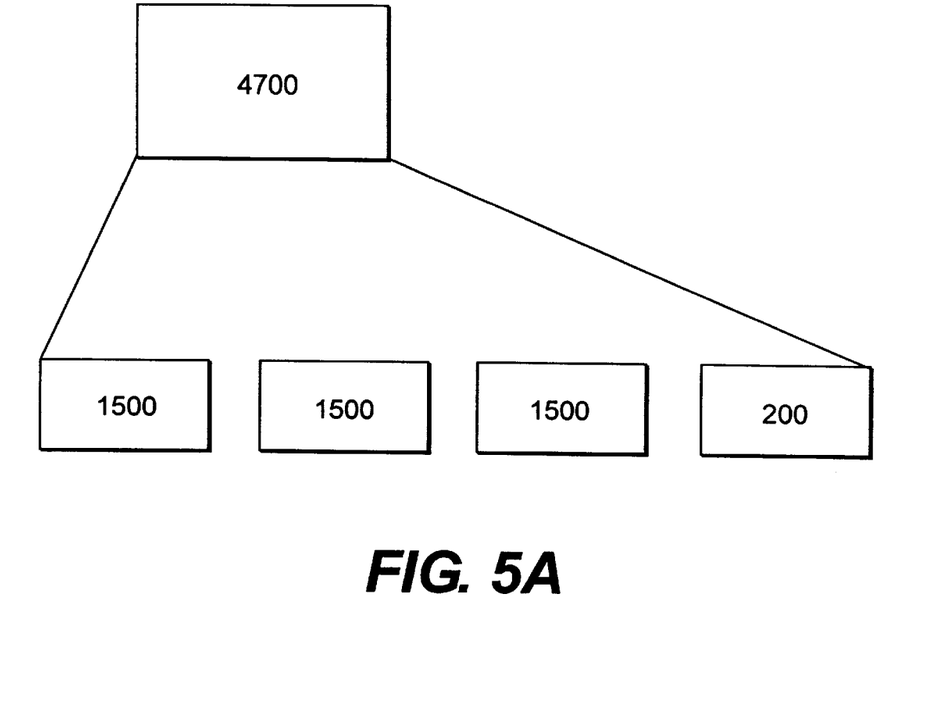
FIG. 5A and FIG. 5B illustrate how a typical prior art method fragments a large datagram unevenly among several datagrams.
Figure 5B:
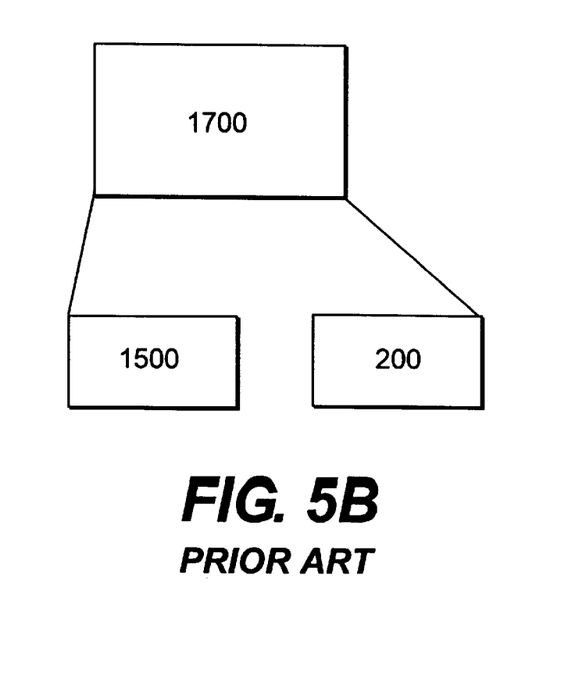

In the past, techniques used to reduce fragmentation have focussed on selecting the proper datagram size but have overlooked how the data is distributed within the actual datagrams. The most common technique sequentially fills datagrams with data and results in a series of larger and smaller datagrams. FIG. 5A and FIG. 5B illustrate how the prior art fragments a 4700 byte datagram and a 1700 byte unevenly among several datagrams in a network having an MTU of 1500 bytes. Accordingly, the 4700 byte datagram in FIG. 5A is distributed into three smaller datagrams of 1500 bytes and a fourth datagram of 200 bytes and the 1700 byte datagram in FIG. 5B is distributed into two smaller datagrams of 1500 bytes and 200 bytes. Frequent fragmentation was not uncommon in the prior art because the larger datagrams were more likely to encounter a network with a smaller MTU.

Figure 5C:
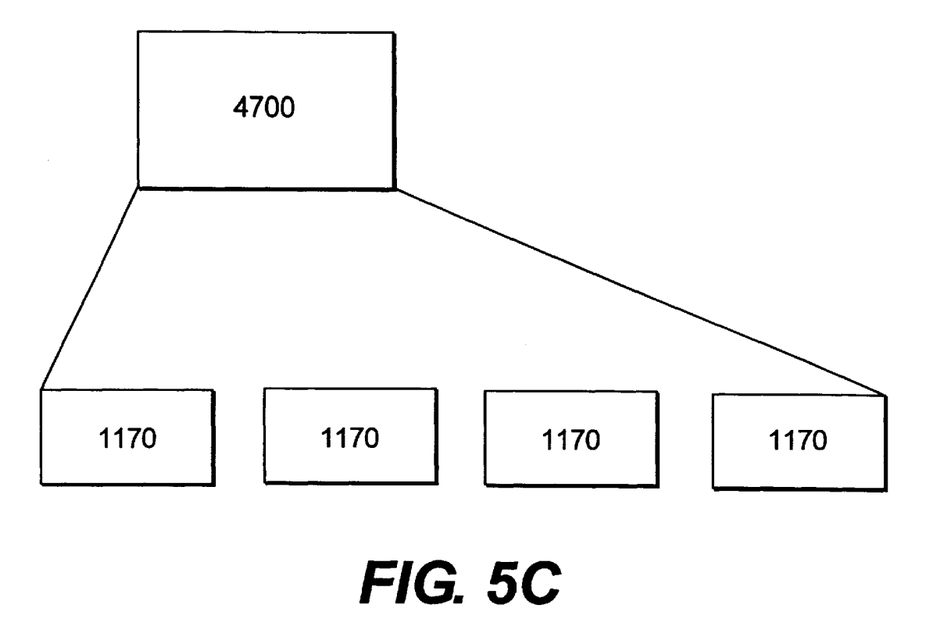
FIG. 5C and FIG. 5D illustrate how one embodiment of the present invention is used to fragment a large datagram evenly among several datagrams.
Figure 5D:
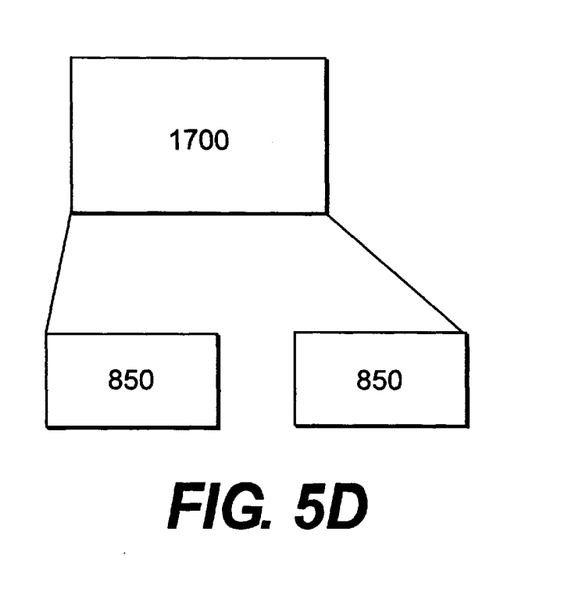

In contrast, embodiments of the present invention provide a technique for evenly distributing data among these datagrams, reducing the maximum fragment size and therefore reducing the probability of fragmentation. This new technique for generating IP datagrams results in an even distribution of data as illustrated in FIG. 5C and FIG. 5D. Accordingly, the 4700 byte datagram divided using principles of the present invention results in 4 datagrams each having 1170 bytes of data and the 1700 byte datagram in FIG. 5D is distributed into two smaller datagrams of 850 bytes. This eloquent solution improves network efficiency with a modification to datagram generation without introducing network incompatibility. As a result, more datagrams are more likely to pass through a network without being fragmented. Details on generating datagrams according to one embodiment of the present invention are discussed in detail below with respect to an IP network.

Initially, the present invention assumes that there is a technique for determining the MTU of the network. Typically, the MTU is determined using either a static or dynamic determination method. Using either method, the present invention can improve network bandwidth by reducing fragmentation. In one embodiment, the MTU of the network is determined statically. In this case, the source host transmitting data sets the MTU value statically to a reasonably small MTU value such as 576 bytes or alternatively the source hosts sets the MTU to the lesser of 576 bytes or the first-hop MTU to any network that is not connected to the same local network or subnet as the source host.

In an alternative embodiment, the source host determines the MTU of a path dynamically by querying the nodes along a given route of the Internet at a predetermined time interval to determine the Path MTU (PMTU). The PMTU indicates the minimum of the MTUs associated with each hop in the given particular route and provides an upper bound on the MTU for a datagram transmitted across an IP network. On the Internet, the PMTU is made available using a technique called "Path MTU Discovery" and is documented in RFC 1191 entitled "Path MTU Discovery" written by Jeffrey Mogul and Steve Deering and published in conjunction with the Internet Engineering Task Force (IETF). To implement PMTU, the present invention also assumes that a host-to-host communication facility exists which allows the hosts to exchange information on the network status and local host resources as the datagrams are transmitted across the network. One type of host-to-host datagram communication typically used on the Internet and other IP based networks is the Internet Control Message Protocol (ICMP) and is documented in RFC 792 entitled "Internet Control Message Protocol" written by J.Postel and published in conjunction with the IETF. Both of the above documents relating to Path MTU Discovery and ICMP are used by one embodiment of the present invention. Those skilled in the art will also understand that alternative embodiments of the present invention could also be adapted to work on networks having analogous network services similar to ICMP and PMTU Discovery.

Figure 6:
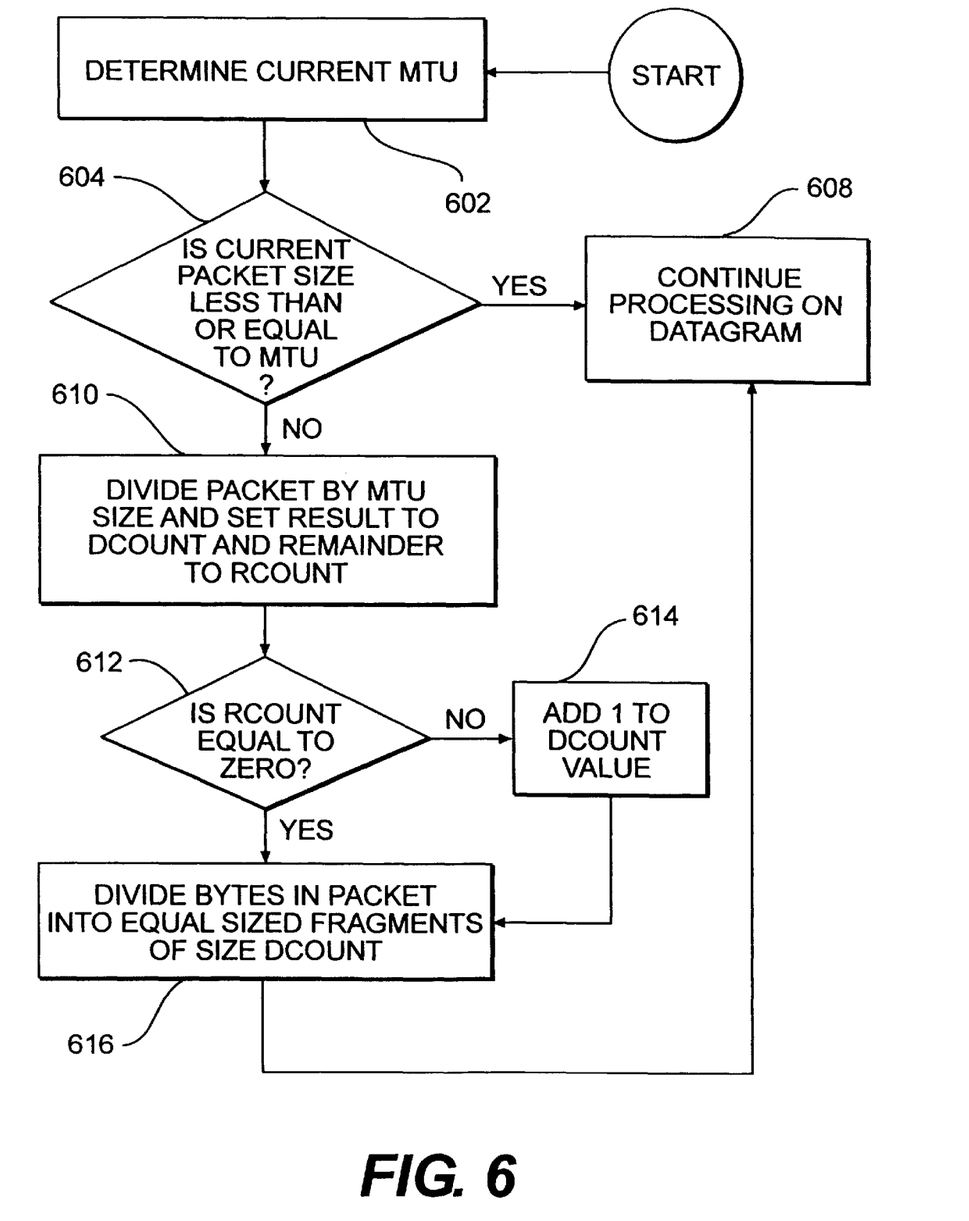
FIG. 6 is a flow chart illustrating the overall steps used to generate a datagram packet in accordance with one embodiment of the present invention.

Referring to FIG. 6, a flow chart includes the overall steps used to determine the optimal size of a datagram packet in accordance with one embodiment of the present invention. Initially, at step 602 the method determines the maximum transmission unit (MTU) for a given route between a source host and a destination host over the Internet. As previously discussed, selecting the MTU can be a difficult process. In most connectionless networks, the MTU value can fluctuate rapidly as the routing topology changes and the datagrams are sent over different routes to the destination host. When a primary route becomes unavailable, because it is busy or has become physically severed, the network topology changes and packets must be routed over a different secondary route. Each different route generally has a different MTU value. In one embodiment, the PMTU discovery technique discussed above is performed once before each data transmission to determine the MTU. This MTU value can be used as a starting point for datagram generation in accordance with the present invention. Alternatively, another embodiment of the present invention can perform a series of PMTU discoveries at predetermined time intervals during data transmission to accommodate fluctuations in the MTU size which may occur over time. In general, the frequency of these PMTU discoveries should not be so often that they impact overall network performance. RFC 1191 Path MTU Discovery and RFC 792 ICMP discussed above briefly explains how ICMP and Path MTU Discovery are used together to determine the MTU of a given route. Of course, embodiments of the present invention could also determine the MTU value of a given network using the static MTU determination techniques discussed above.

Next, at determination step 604, the method compares the size of the current datagram with the MTU value determined above. If the size of the current datagram is less than or equal to the MTU, the datagram is small enough to make it from the source host to the destination host without being fragmented into smaller datagrams and the datagram is sent for further datagram processing at step 608. However, if the datagram size is larger than the MTU value, the steps discussed below are used to divide the datagram into a series of smaller datagrams which minimize the probability of fragmentation later on.

Continuing with step 610 in FIG. 6, the MTU value and the total number of bytes in the original datagram or data packet are used to determine how many smaller datagrams need to be sent. At step 610, the total number of bytes contained in the original datagram are divided by the MTU value determined above. The integer result of the division is placed in a temporary variable DCOUNT and the remainder, if any, is stored in a temporary variable RCOUNT. These values are used in decision step 612 to determine if an additional datagram is needed to carry the original datagram data. At decision step 612, the remainder stored in RCOUNT is compared with the zero value. If result of the comparison indicates that RCOUNT is non-zero, processing transfers to step 614 where the need for an additional datagram is indicated by incrementing the DCOUNT value. However, if the value of RCOUNT is zero, no additional datagrams are required to transmit the data in the original datagram and processing transfers to step 616 without incrementing DCOUNT.

At step 616, the bytes in the original datagram are evenly distributed into a number of datagrams as indicated by the value stored in DCOUNT. Those skilled in the art understand that each smaller datagram generated receives the same header information contained in the original datagram with addresses, offsets, checksums, and other specific values adjusted to the specific fragment. In contrast to the datagrams generated by the prior art, these datagrams do not consist of larger and smaller datagram values. Instead, the bytes are distributed equally between each of the smaller datagram segments. Because the resulting datagrams are relatively equal in size, the chance of fragmentation is less likely when a datagram is transmitted along a route having a small MTU.

For example, FIG. 1 illustrates a network having two routes between source node 102 and destination node 114. Route A includes networks 104, 108, and 112, and has a path MTU (PMTU) of 1100 bytes and Route B includes networks 104, 118, and 112 and has a path MTU (PMTU) of 1006 bytes. FIG. 5B illustrates how the prior art would divide a 1700 byte datagram into two smaller datagrams for transmission over such a network. Traversing Route A (PMTU 1100), the first datagram in FIG. 5B would make it through router 106 but would not make it to router 110 without being fragmented further. Similarly over Route B (PMTU 1006), the first datagram must also be fragmented traveling between router 106 and node 116. The second datagram in FIG. 5B would make it over either route without being further fragmented. The additional overhead associated with further fragmentation results in overhead and reduced network efficiency.

In contrast, FIG. 5D illustrates how embodiments of the present invention more optimally divide the same number of bytes into the same number of datagrams. Rather than storing more bytes in some datagrams and less bytes in other datagrams, the present invention divides the data transmission evenly into a minimum number of datagrams. In this example, both datagrams in FIG. 5D contain only 850 bytes. Consequently, both these datagrams will pass through Route A and Route B in FIG. 1 without fragmentation.

There are several advantages to embodiments of the present invention which were previously unavailable in the art. First, techniques provided in the present invention reduce the probability of fragmentation without increasing the amount of network overhead because the number of datagrams transmitted remains substantially unchanged. In the best case, these techniques will significantly reduce fragmentation and thus increase the effective network bandwidth while in the worst case, these techniques will perform as efficiently as other methods.

Embodiments of the present invention are also advantageous because they increase network performance without introducing incompatibilities into network protocol. In most large networks any change to a low level layer in the network protocol invariable results in incompatibilities and reduces network interoperability. This is especially true on the Internet where hundreds and thousands of computers running protocols such as IP or TCP/IP can not be readily modified. This dilemma does not occur in the present case because improvements in the IP layer which do not fundamentally change how the IP protocol operates. Accordingly, teachings of the present invention provide an eloquent solution to the difficult problem of maintaining network interoperability and improving effective network bandwidth.

While specific embodiments have been described herein for purposes of illustration, various modifications may be made without departing from the spirit and scope of the invention. Those skilled in the art understand that embodiments of the present invention can be implemented using a variety of different networking protocols and are not limited to computer systems coupled to a network using the TCPIP protocol. Alternative embodiments substantially similar to the preferred embodiment could be implemented using other network protocols such as SNA (Systems Network Architecture), IPX/SPX, Appletalk, or X.25. For more information on integrating TCP/IP and SNA networks see *Integrating TCP/IP Into SNA*, Taylor, Wordware Publishers, 1993. Further, another alternative embodiment substantially similar to the preferred embodiment could be implemented except that PMTU values are not just gathered once but are updated numerous times at a predetermined time interval. Yet another alternative embodiment substantially similar to the preferred embodiment could be implemented except that it is applied to any network having maximum packet size transmission limitations. In general, although bytes are used to measure the size of a datagram in the present case, those skilled in the art understand that size of a datagram could also be measured in any other measures of transmission units such as bits, blocks, or even streams of data measured by time intervals.

Accordingly, the invention is not limited to the above described embodiments, but instead is defined by the appended claims in light of their full scope of equivalents.

What is claimed is:

1. A method executed by a computer for determining the size of a packet to be transmitted over different routes on a network wherein each route may carry different size packets and the size of a packet is determined by a total number of storage units contained within the packet, the method comprising the steps of:

providing a maximum transmission unit (MTU) capable of being transmitted over each one of a set of routes of the network, wherein the MTU is set to the lesser of a predetermined minimum MTU or the MTU associated with a first-hop to any network that is not connected to the same network or subnetwork as a transmitting host;

comparing a size of a packet to be transmitted over the network with a size of the MTU associated with a particular one of the routes on the network; and when the comparison indicates the size of the packet is larger than the size of the MTU associated with the particular one of the routes, further processing the packet by separating the number of storage units in the packet into substantially even groupings of units stored in one or more packets, wherein each of the one or more packets are capable of holding MTU storage units.

2. The method of claim 1 wherein the step of separating the storage units in the packet into substantially even groupings further comprises the steps of:

dividing the total number of storage units contained within the packet by the MTU value;

storing the integer result of the division in a DCOUNT variable and the remainder of the division in a RCOUNT variable;

incrementing the DCOUNT value by one, if the remainder in RCOUNT is non-zero; and redistributing the total number of storage units contained in the original packets equally into DCOUNT packets.

3. The method of claim 1 wherein the predetermined minimum MTU is 576 bytes.

4. A method executed by a computer for determining the size of a packet to be transmitted over different routes on a network wherein each route may carry different size packets and the size of a packet is determined by a total number of storage units contained within the packet, the method comprising the steps of:

providing a maximum transmission unit (MTU) capable of being transmitted over each one of a set of routes of the network, wherein the step of providing the maximum transmission unit (MTU) is performed by querying each node along a route to determine the maximum packet size each node can transmit along the route;

comparing a size of a packet to be transmitted over the network with a size of the MTU associated with a particular one of the routes on the network; and when the comparison indicates the size of the packet is larger than the size of the MTU associated with the particular one of the routes, further processing the packet by separating the number of storage units in the packet into substantially even groupings of units stored in one or more packets, wherein each of the one or more packets are capable of holding MTU storage units.

5. A mechanism configured to determine the size of a packet to be transmitted over different routes on a network wherein each route may carry different size packets and the size of a packet is determined by a total number of storage units contained within the packet, the mechanism comprising:

a mechanism configured to provide a maximum transmission unit (MTU) capable of being transmitted over each one of a set of routes of the network, wherein the MTU is set to the lesser of a predetermined minimum MTU or the MTU associated with a first-hop to any network that is not connected to the same network or subnetwork as a transmitting host;

a mechanism configured to compare a size of a packet to be transmitted over the network with a size of the MTU associated with a particular one of the routes on the network;

a mechanism configured to further process the packet when the comparison indicates the size of the packet is larger than the size of the MTU associated with the particular one of the routes; and a mechanism configured to separate the number of storage units in the packet into substantially even groupings of units stored in one or more packets, wherein each of the one or more packets are capable of holding MTU storage units.

6. The mechanism of claim 5 wherein the mechanism configured to separate the number of storage units further comprises:

a mechanism configured to divide the total number of storage units contained within the packet by the MTU value;

a mechanism configured to store the integer result of the division in a DCOUNT variable and the remainder of the division in a RCOUNT variable;

a mechanism configured to increment the DCOUNT value by one, if the remainder in RCOUNT is non-zero; and a mechanism configured to redistribute the total number of storage units contained in the original packets equally into DCOUNT packets.

7. The mechanism of claim 5 wherein the predetermined minimum MTU is 576 bytes.

8. The mechanism in claim 5 embedded in a computer system coupled to a network having a first network interface element, a second network interface element, a processor element, a primary storage element, a secondary storage element, and an I/O (input output) interface element which facilitates communication between these aforementioned elements.

9. A mechanism configured to determine the size of a packet to be transmitted over different routes on a network wherein each route may carry different size packets and the size of a packet is determined by a total number of storage units contained within the packet, the mechanism comprising:

a mechanism configured to provide a maximum transmission unit (MTU) capable of being transmitted over each one of a set of routes of the network, wherein the maximum transmission unit (MTU) is provided by a mechanism configured to query each node along a route to determine the maximum packet size each node can transmit along the route;

a mechanism configured to compare a size of a packet to be transmitted over the network with a size of the MTU associated with a particular one of the routes on the network;

a mechanism configured to further process the packet when the comparison indicates the size of the packet is larger than the size of the MTU associated with the particular one of the routes; and a mechanism configured to separate the number of storage units in the packet into substantially even groupings of units stored in one or more packets, wherein each of the one or more packets are capable of holding MTU storage units.

10. A computer program product comprising:

a computer usable medium having computer readable code embodied therein capable of generating packets for transmission over different routes on a network wherein each route may carry different size packets comprising:

a code portion configured to provide a maximum transmission unit (MTU) capable of being transmitted over each one of a set of routes of the network, wherein the MTU is set to the lesser of a predetermined minimum MTU or the MTU associated with a first-hop to any network that is not connected to the same network or subnetwork as a transmitting host;

a code portion configured to compare a size of a packet to be transmitted over the network with a size of the MTU associated with a particular one of the routes on the network;

a code portion to further process the packet when the comparison indicates the size of the packet is larger than the size of the MTU associated with the particular one of the routes; and a code portion configured to separate the number of storage units in the packet into substantially even groupings of storage units stored in one or more packets, wherein each of the one or more packets are capable of holding MTU storage units.

11. The computer program product of claim 10, wherein the third code portion further comprises:

a fourth code portion configured to divide the total number of storage units contained within the packet by the MTU value;

a fifth code portion configured to store the integer result of the division in a DCOUNT variable and the remainder of the division in a RCOUNT variable;

a sixth code portion configured to increment the DCOUNT value by one, if the remainder in RCOUNT is non-zero; and a seventh code portion configured to redistribute the total number of transmission units contained in the original packets equally into DCOUNT packets.

12. The code in claim 10 wherein the predetermined minimum MTU is 576 bytes.

13. A computer program product comprising:

a computer usable medium having computer readable code embodied therein capable of generating packets for transmission over different routes on a network wherein each route may carry different size packets comprising:

a code portion configured to provide a maximum transmission unit (MTU) capable of being transmitted over each one of a set of routes of the network, wherein the code configured to provide the MTU queries each node along a route at a predetermined time interval to determine the maximum size packet each node can transmit over the route;

a code portion configured to compare a size of a packet to be transmitted over the network with a size of the MTU associated with a particular one of the routes on the network;

a code portion to further process the packet when the comparison indicates the size of the packet is larger than the size of the MTU associated with the particular one of the routes; and a code portion configured to separate the number of storage units in the packet into substantially even groupings of storage units stored in one or more packets, wherein each of the one or more packets are capable of holding MTU storage units.

14. A computer data signal embodied in a carrier wave and representing sequences of instructions which, when executed by a processor, determines the size of a packet to be transmitted over different routes on a network wherein each route may carry different size packets and the size of a packet is determined by a total number of storage units contained within the packet, by performing the following steps of:

providing a maximum transmission unit (MTU) capable of being transmitted over each one of a set of routes of the network, wherein the MTU is set to the lesser of a predetermined minimum MTU or the MTU associated with a first-hop to any network that is not connected to the same network or subnetwork as a transmitting host;

comparing a size of a packet to be transmitted over the network with a size of the MTU associated with a particular one of the routes on the network;

when the comparison indicates the size of the packet is larger than the size of the MTU associated with the particular one of the routes, further processing the packet by, separating the number of storage units in the packet into substantially even groupings of units stored in one or more packets, wherein each of the one or more packets are capable of holding MTU storage units.

15. The computer data signal embodied in a carrier wave of claim 14 wherein the step of separating the storage units in the packet into substantially even groupings further comprises the steps of:

dividing the total number of storage units contained within the packet by the MTU value;

storing the integer result of the division in a DCOUNT variable and the remainder of the division in a RCOUNT variable;

incrementing the DCOUNT value by one, if the remainder in RCOUNT is non-zero; and redistributing the total number of storage units contained in the original packets equally into DCOUNT packets.

16. A computer data signal embodied in a carrier wave and representing sequences of instructions which, when executed by a processor, determines the size of a packet to be transmitted over different routes on a network wherein each route may carry different size packets and the size of a packet is determined by a total number of storage units contained within the packet, by performing the following steps of:

providing a maximum transmission unit (MTU) capable of being transmitted over each one of a set of routes of the network, wherein the step of providing the maximum transmission unit (MTU) is performed by querying each node along a route to determine the maximum packet size each node can transmit along the route;

comparing a size of a packet to be transmitted over the network with a size of the MTU associated with a particular one of the routes on the network;

when the comparison indicates the size of the packet is larger than the size of the MTU associated with the particular one of the routes, further processing the packet by, separating the number of storage units in the packet into substantially even groupings of units stored in one or more packets, wherein each of the one or more packets are capable of holding MTU storage units.

17. The computer data signal embodied in a carrier wave of claim 14 wherein the predetermined minimum MTU is 576 bytes.

* * * * *